April 5, 1960  G. E. SANCTUARY  2,931,598
EJECTION SEAT FOR AIRCRAFT
Filed Nov. 14, 1956  3 Sheets-Sheet 2

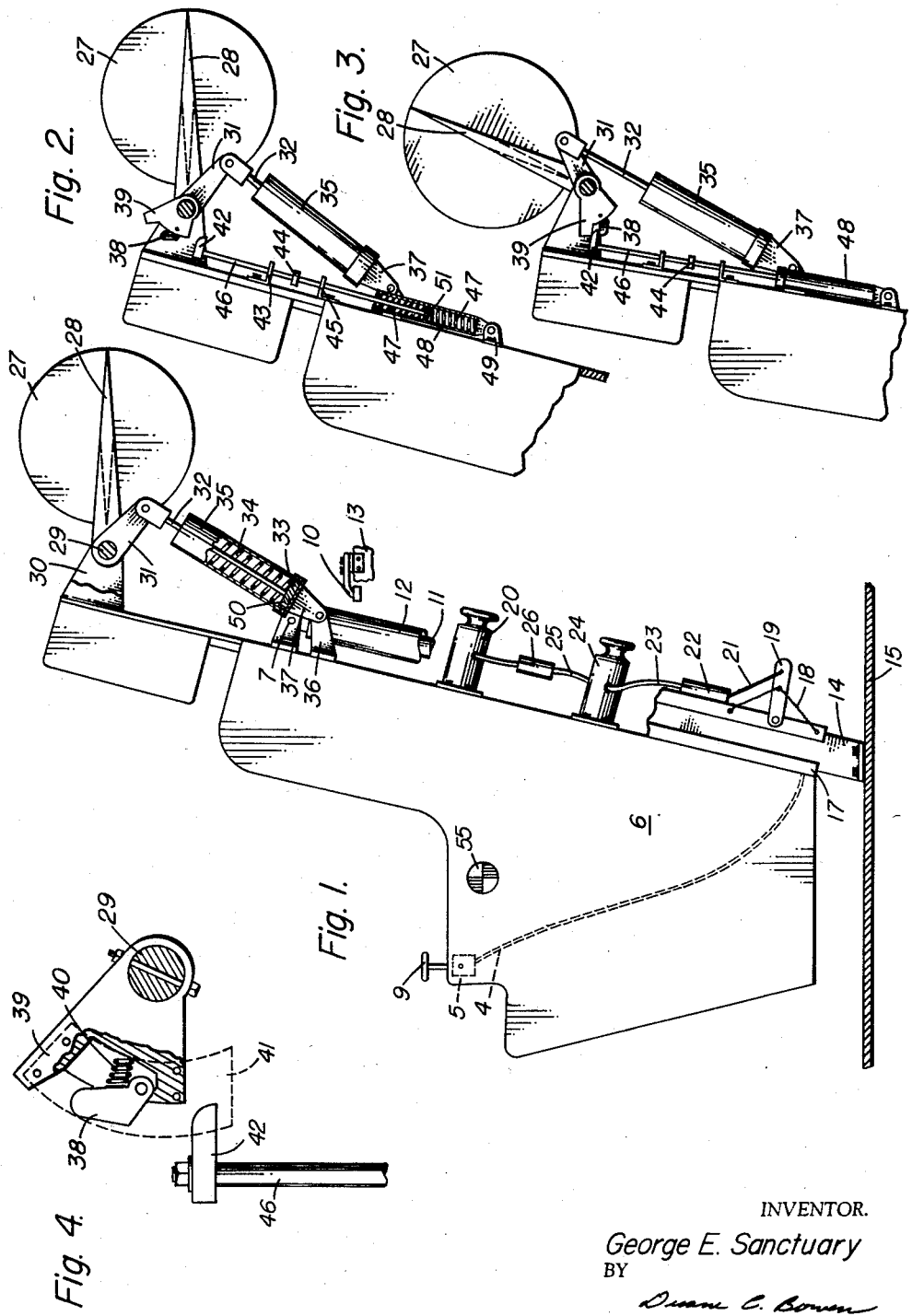

INVENTOR.
George E. Sanctuary
BY
ATTORNEY.

April 5, 1960 G. E. SANCTUARY 2,931,598
EJECTION SEAT FOR AIRCRAFT
Filed Nov. 14, 1956 3 Sheets-Sheet 3

INVENTOR.
George E. Sanctuary
BY
*Duane C. Bowen*
ATTORNEY.

United States Patent Office 2,931,598
Patented Apr. 5, 1960

2,931,598
EJECTION SEAT FOR AIRCRAFT

George E. Sanctuary, Wichita, Kans., assignor to Boeing Airplane Company, Wichita, Kans., a corporation of Delaware Application November 14, 1956, Serial No. 622,200

13 Claims. (Cl. 244—122)

This invention relates generally to aircraft seats of the ejection variety, and pertains more particularly to a seat of this type that will become oriented into a preferred position, together with its occupant, after ejectment.

This application is a continuation-in-part of the patent application Serial Number 593,491, filed June 26, 1956, in the name of George E. Sanctuary, entitled "Ejection Seat for Aircraft," now abandoned.

Many studies involving a gerat deal of time have been made in connection with seat ejecting mechanisms for aircraft. As aircraft speeds have reached greater and greater magnitudes, the problems of preserving human life have multiplied during high speed bail-outs. This has proved to be especially so during speeds in the supersonic range, for the inertia forces to which the seat occupant is subjected during the deceleration period immediately following ejection are equivalent to many times the force of gravity and are often beyond human endurance. The problem of abrupt deceleration has been recognized by the aircraft industry, but no satisfactory solution has yet been evolved.

Accordingly, one important object of the invention is to cause an appreciable reduction in the drag forces imposed upon the seat and its occupant when suddenly thrust into the airstream, thereby producing a much less severe deceleration than heretofore. This is accomplished by forcing the seat into an optimum low drag position, aerodynamically speaking, upon ejection so that the occupant is subjected to inertia forces of much less magnitude. More specifically, the invention contemplates the forceful rolling or tilting of the seat about a transverse axis in a backward direction, the seat thus presenting much less frontal area to the airstream.

Another object of the invention is to obtain the preferred orientation of the seat, together with its occupant, almost instantly after it leaves the airplane.

Not only is it an object of the invention to oppose or minimize drag action, as mentioned above, but another object of the invention is to supply a lifting force to the seat, other than that derived from the initial catapulting action, which will assist in elevating both the seat and its occupant so as to prevent possible collision with the forwardly advancing tail fin of the plane. It will be evident to those skilled in the art that the rocket assistance envisaged in the instant invention will also permit a reduction in the applied catapulting forces, thereby reducing to some extent the severity of acceleration stemming from the catapulting charges. However, the tail fin clearance is of prime importance, and care should be exercised that this is first achieved for the highest flight speeds that may be encountered.

Still another object of the invention is to provide a means for instantly stabilizing the ejected seat against both rotation and oscillation, and for maintaining it in a stabilized condition until it has slowed sufficiently that the release of the parachute becomes practical.

The invention, together with other objects attending its production, will be more clearly understood when the following description is read in connection with the accompanying drawings, in which:

Figure 1 is a side elevational view, partly in section, of a seat as it appears before ejection, the view depicting a stabilizing fin in its normal position;

Figure 2 is a fragmentary elevational view, partly in section, illustrating the fins in a pre-latched condition, the fin position corresponding to that of Figure 1;

Figure 3 is a view closely resembling Figure 2, this view however depicting the stabilizing fins of Figures 1 and 2 in a different relative position, this being a latched condition;

Figure 4 is an enlarged fragmentary detail corresponding to Figure 2 but with portions thereof broken away and shown in section for purposes of clarity;

Figure 5:
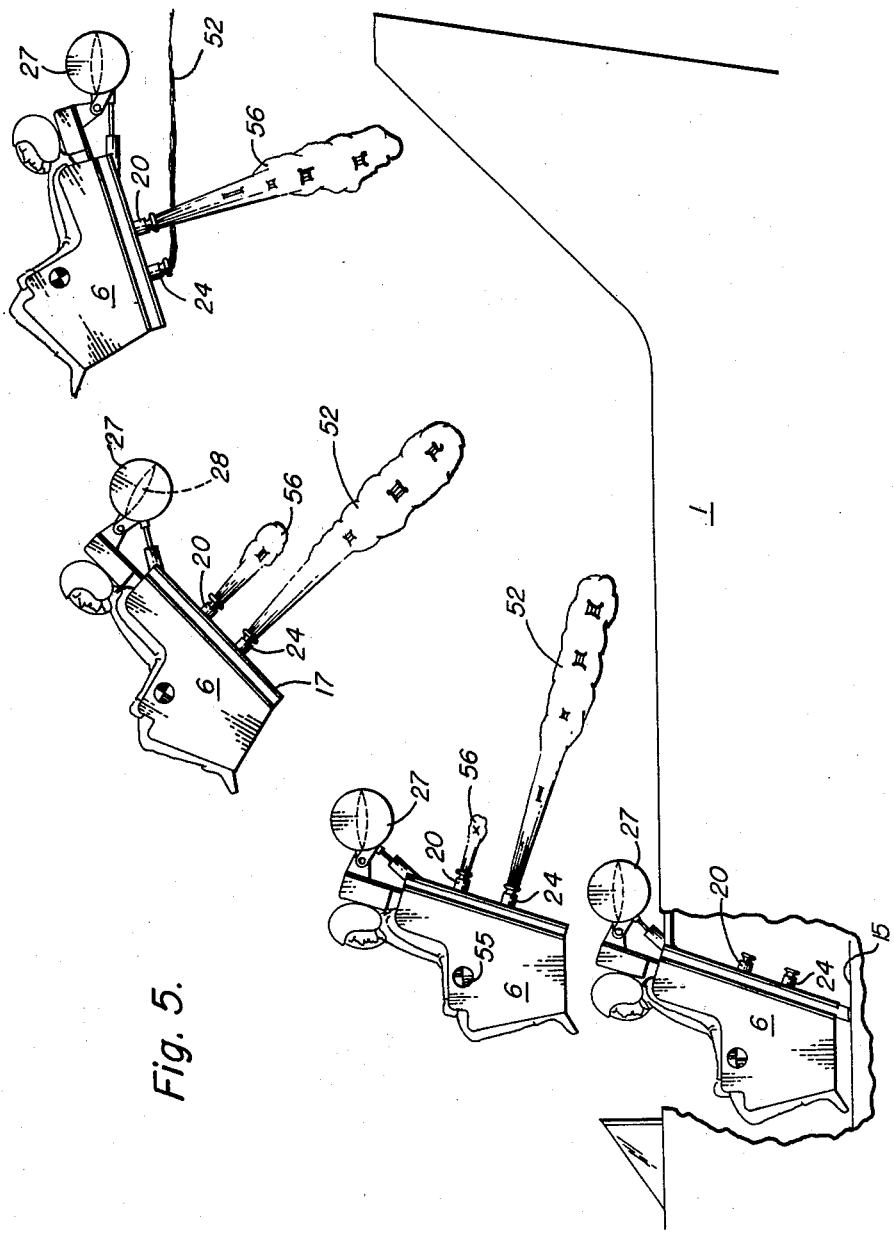
Figure 5 is a sequential view picturing the seat and its occupant in various catapulted stages, the most elevated stage illustrating a minimum drag position.
Figure 6:
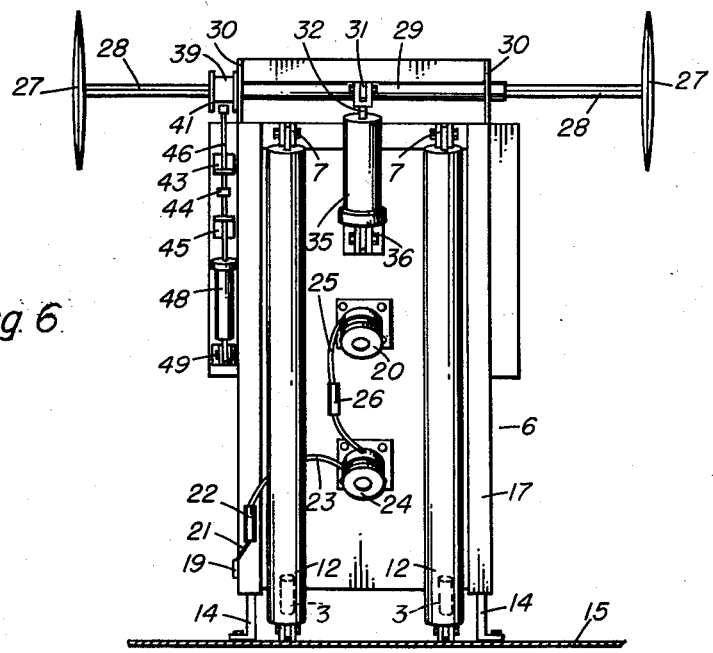
Figure 6 is a rear elevational view of the seat.

For the purpose of establishing various relative positions that occur during a seat ejectment, an airplane 1 has been pictured rather schematically in Figure 5. The specific construction of the aircraft is unimportant to an understanding of the invention, and therefore need not be depicted in detail.

Within the plane 1 is mounted a seat structure 6. In conventional fashion, the seat 6 is carried on a pair of upwardly and rearwardly inclining support rails 14 which are fixedly secured at their lower ends to the flooring 15 of the plane (seen to better advantage in Figure 1). The seat 6 is rendered slidable upon these fixed rails 14 by virtue of a pair of seat rails 17, the rails 17 being bolted or otherwise permanently attached to the back side of the seat 6. The seat is substantially fully guided by the rails until it leaves the plane. There is a pair of catapult outer tubes 12 having their lower ends affixed to the flooring 15, each of these outer tubes having telescopically received therein an inner tube 11 which is secured at its upper end to the seat 6 through the intermediary of a seat trunnion 7.

The seat structure 6 described above, together with the elements appurtenant thereto for catapulting the seat upwardly out of the plane 1, are not new but are deemed necessary in order to illustrate the improvement about to be presented. Before describing the improved arrangement, however, it might be well to explain rather briefly the manner in which the seat 6 is ejected from the plane, even though the manner of ejection is old. It will be observed that the seat 6 is equipped with a readily accessible emergency ejection handle 9, the actuation of which serves to fire a conventional initiator 5. The initiator contains a cartridge which when fired emits high pressure gases into gas lines 4 which lead to the base of each outer tube 12. Contained in each cylinder is a catapult 3 charge that is set off by the gases from the initiator cartridge. Upon firing of the catapult charges 3, the seat is ejected upward. The upward travel of the seat is guided by the slidable engagement existing between the rails 14 and 17.

The upward catapulting force is applied aft of the seat back in the above described prior art structure and well aft of the center of gravity of the seat-occupant combination. This gives the seat an initial counterclockwise rotation, as viewed in Figure 5, in a forward direction about a transverse horizontal axis as the seat moves into the airstream unless the stroke is fully guided. With a fully guided stroke, the seat is not biased counterclockwise by the catapult but the aerodynamic forces of the airstream as the seat leaves the plane are heavier on the lower portion which has a larger frontal area below the seat-occupant center of gravity than above, and a counterclockwise movement is produced. The speed of this rotation may be injurious or even fatal to the occupant, especially with plane speeds in excess of Mach one. This seat rotation continues until a natural dampening has had time to take place.

Counterclockwise rotation swings the occupant head forward into the airstream. This is undesirable even if means were provided to bring the seat into a minimum drag position because the G-loading forces the blood to the head of the occupant. Physiologically, this is intolerable under high G-loading. The occupant can much better withstand high G-loads in the clockwise direction in which the blood tends to be forced toward the feet. A position with the body normal to the airstream is best physiologically, but higher G-loads would be produced with a seat in such position. The occupant can better take lower G-loads rolled back clockwise than higher G-loads in the normal position.

Having prefaced the description of the improved seat arrangement with the above preliminary remarks, it is felt that the problems that have plagued the industry with presently available ejection-type seats will be fully appreciated. To combat the problems that have been heretofore encountered, one of the seat rails 17 is provided with a safety wire 18 having its opposite ends fixedly anchored to the rail 17 at spaced locations and having an intermediate portion thereof attached to a pivotally mounted trigger arm 19, the wire 18 normally functioning to retain the arm 19 in a rearwardly projecting direction. Located at an elevation preferably approximately six inches below the height at which the inner catapult tubes 11 leave the outer tubes 12 during ejection is a stop or cam member 10 which is mounted on a fixed portion 13 of the plane 1, as can be seen from Figure 1. Inasmuch as the stop member 10 is disposed directly in the path of the distal end of the arm 19, this arm will be deflected downwardly when it engages the stop member 10, thus breaking the safety wire 18.

Figure 8:
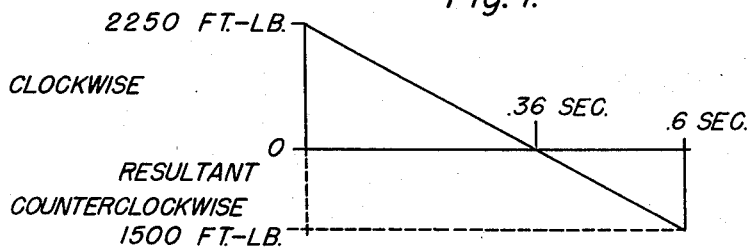
Figure 8 is a thrust-line composite of the graph of Figure 7.

Through the medium of a cable 21 having its lower ends fastened to the arm 19, a conventional initiator 22 is fired, releasing its resulting high pressure gases into a gas line 23, leading to a rocket 24 mounted on the back of the seat 6. A second rocket 20 is preferably connected in series to rocket 24 by line 25 and a second initiator 26 may be interposed in line 25. Initiator 26 is fired by gases from initiator 22 or rocket 24. Firing of the two rockets may be substantially simultaneous or rocket 20 may be delayed until the burnout of rocket 24. Although two rockets are shown, rocket 24 achieves favorable results by itself, at certain speeds and altitudes, particularly in conjunction with the novel fin means shown. The use of more than two rockets to achieve a favorable thrust composite such as is shown in Figure 8 will be understood.

The relative location of the rockets 24, 20 with respect to the center of gravity of the seat-man combination is important. By locating the rocket 24 below the center of gravity, as shown, its forward thrust counteracts the above described forward or counterclockwise rotation of the seat. A location of the rocket 24 six inches below the combined center of gravity has proved satisfactory. With this rocket arrangement the rocket produced thrust is not only sufficient to overcome the tendency for the seat 6 to be rotated forwardly, but actually tilts it backward. As the seat 6 tilts backwardly, the direction of rocket thrust changes, as illustrated in Figure 5, and an upward component of force is applied to the seat. This lifting action supplements that derived from the catapult charges and is such as to assure that the seat and its occupant clear the tail fin of the still forwardly moving plane. Second rocket 20 adds significantly to the height at which the seat man will clear the airplane vertical fin.

As the seat 6 is rotated backward in the airstream, its frontal or drag area is greatly reduced. Air drag forces are applied to a pair of fin assemblies, each of which comprises a vertical fin 27 and a transverse fin 28. These fin assemblies are keyed and bolted to opposite ends of a transverse shaft 29 journaled in brackets 30 fixedly secured to the back of the seat 6. Due to airloads encountered as the seat 6 tilts backwards in the airstream, the fins 28 apply a moment opposing the backward tilting movement being created by the rocket 24. As the seat 6 continues to tilt, the fin moment together with second rocket 20 soon equals the rocket moment, thereby stopping the tilting movement of the seat.

Fins 28 at certain speeds and altitudes are sufficient to stop the clockwise rotation (as viewed in Figures 1 and 5) but more positive action and greater range of operability at other speeds and altitudes are obtained by a second opposing rocket 20. For example, the fins 28 are relatively ineffective at slow airplane speeds to resist clockwise rotation because of low air loads acting thereon and rocket 20 is the primary force to stop this rotation. It is preferably directed on a line about six inches above the combined center of gravity. The rockets are generally horizontally directed and in the preferred structure shown are normal to the seat back and rails 14, 17 in the Figure 1 position.

Figure 7:
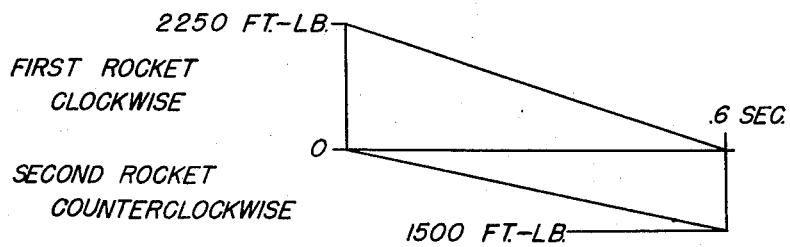
Figure 7 is a graph of the relative firing of the rockets in terms of thrust and time.

A specific example of the relative firing of the first and second rockets is shown in Figures 7 and 8. Tapered charges are used, although suitable clockwise and counterclockwise moment could be obtained with different timed rectangular charges, with rocket 24 starting at a maximum of 4500# thrust (2250 foot-pounds torque) clockwise and terminating at about 0.6 second and rocket 20 starting at zero thrust and reaching a maximum 3000# thrust (1500 f.p. torque) counterclockwise at 0.6 second. The composite of Figure 8 shows a 2250 f.p. clockwise torque starting at zero seconds after separation of catapult, shows zero torque at 0.36 second and shows a 1500 f.p. counterclockwise torque at 0.6 second. The details of the art of rocket timed firings and types of charges are well known to those working in that field and are not described here. In the preferred configuration shown, the catapult and rocket charges are separately housed.

During the above described action aerodynamic forces on the fins 28 cause them to slowly rotate counterclockwise to the position shown in the uppermost part of Figure 5, in which position they thereafter serve to stabilize the seat position in the air to maintain it in a reduced drag attitude. To control the mentioned fin movement a crank arm 31 is made integral with the shaft 29 so as to be rotatable therewith, and the free end of this arm is pivotally connected to the projecting end of a piston rod 32 having its plunger 33 reciprocably disposed within a cylinder 35. A coil spring 34 bearing against plunger 33 normally maintains the plunger in the position shown in Figure 1, and consequently also serves to maintain the fins 28 in their Figure 1 positions. As shown, a cylinder cap 37 is provided with an integral ear which is pivotally connected to a bracket 36 affixed to the seat structure 6. Cylinder 35 and its plunger constitute a conventional dash pot, the cylinder being filled with hydraulic fluid and plunger 33 being provided with a metering orifice 50. Thus the above described fin movement from the Figure 1 position to the Figure 3 position is both retarded by spring 34 and resisted and controlled by the dash pot action.

While the fins 28 are normally positioned horizontally relative to the seat 6, nonetheless, as explained above, when the seat is ejected the force of the airstream causes fins 28 to pivot about shaft 29 toward the position shown in Figure 3. A rotation through 60° has been found desirable, because it results in a preferred disposition of the fins 28 when the seat 6 reaches its minimum drag position, as indicated by the uppermost seat location in Figure 5. Of course the speed of rotation of the fin assemblies is controlled by the damper action obtained from the travel of the plunger 33 through the confined hydraulic fluid in the cylinder 35.

However, in order to retain the fins 27 within preferred limits of oscillation after they reach the above mentioned 60° position, a latching arrangement is provided. Since the fin assemblies are carried on the shaft 29, the shaft also rotates through the same angle. To limit the angle of swing of the fin assemblies after reaching the 60° or median position, a dog 38 (Figures 3 and 4) is pivotally mounted on a cam 39 affixed to the shaft 29 so as to be rotatable in unison therewith, the dog 38 being biased in a counterclockwise direction relative to cam 39 by means of a coil spring 40 (Figure 4). Two spaced guide plates 41 are secured one to each opposite side surface of cam 39, as indicated by the broken lines in Figure 4.

A cam follower 42 projects into the space between and is guided by the plates 41. Follower 42 is mounted on the upper end of a rod 46, which is constrained for reciprocal movement relative to the seat 6 by means of vertically spaced brackets 43, 45 attached to said seat. The brackets also serve to limit the distance the rod may move up and down inasmuch as the rod 46 has affixed thereto a limit stop 44 normally residing midway between the brackets 43, 45. By properly spacing the brackets 43, 45 the fins 28 can be prevented from oscillating more than a desired number of degrees above or below a central or median position illustrated in Figure 3.

The lower end of the rod 46 is provided with a plunger 51 (Figure 2) reciprocably mounted within a cylinder 38. On each side of the plunger 51 are springs 47 which through the latch mechanism described above oppose rotation of the shaft 29 to either side of their Figure 3 position. Thus, the springs 47 assist in maintaining this fin position. Through the medium of a bracket 49, the lower end of the cylinder 48 is pivotally connected to seat 6. The mechanism associated with cylinders 35 and 48 both act on shaft 29 but are preferably separate.

As for a typical operation, the conventional ejection of the seat 6 upon pulling the emergency handle 9 has already been dealt with and need not be repeated here, especially since the initial catapulting action is of a type which has been extensively employed heretofore. Therefore, if we assume that the seat 6 is moving upwardly, carrying therewith the seat rails 17, when the rearwardly extending arm 19 strikes the stop 10 it is deflected downwardly, tensioning the cable 21 and thus setting off the initiator 22 which in turn fires rocket 24 via the gas line 23 and rocket 20 via gas line 25. By properly locating the arm 19 with respect to the stop 10 it will be recognized that the firing of the rocket can be made to occur the instant the seat 6 leaves the plane 1 which would then become zero in time in graphs of Figures 7 and 8.

Advantage is then taken of the rocket thrust, as evidenced from the stream of gases labeled 52, to roll the seat 6 in a clockwise direction, the progressive rolling action being easily discerned by the sequence of views presented in Figure 5. It might be pointed out that the thrust from the rocket 24 need only persist over a very short span of time, approximately 0.25 to 0.60 second being usually sufficient. The rocket 24 is mounted below the center of gravity 55 of the man-seat combination. The forward thrust of rocket 24 forces the seat to tilt clockwise as viewed. As the tilt progresses, the thrust is angled upwardly, thereby introducing an upward thrust component which assists the initial catapulting action to make certain that the tail fin is not encountered.

Rocket 20 fires in counterclockwise opposition to rocket 24 with the firing peaks offset as to time. The gas stream 56 from rocket 20 is shown in Figure 5. Rocket 20 thrusts on a line at the opposite side of the combined center of gravity 55 from the line of thrust of rocket 24.

During the period that the seat 6 is tilting backwardly, the fin assemblies composed of the fins 27 and 28 are being rotated counterclockwise relative to the seat by air action, a controlled retardation being achieved by reason of the hydraulic fluid and its resistance to immediate passage through the metering orifice 50 in the plunger 33, plus the compression resistance of spring 34. During the tilt of the seat to a minimum drag position, the movement of fins 28 to the Figure 3 position causes follower 42 to depress dog 38 and to be latched between the cam 39 and the dog, as clearly shown in Figure 3. Thereafter oscillation of fins 28 is under control of both dash pot cylinder 35 and spring loaded cylinder 48. Since the brackets 43, 45 have been spaced to limit oscillation of the fins 27, 28 to 10° to either side of the median position pictured in Figure 3, and in the uppermost sequential view of Figure 5, no matter what the aerodynamic forces may be after engagement and locking of the follower 42 between the dog 38 and cam 39, the fins 27, 28 cannot thereafter rotate through a total angle greater than 20°, i.e., 10° to either side of the median position which the fins have assumed. Therefore, the seat 6 is well stabilized while in its minimum drag or extended position and the occupant is not subjected to rapid oscillations about the combined seat-occupant center of gravity 55.

Owing to the controlled trajectory of the seat 6, together with the accompanying rapidity of achieving a minimum drag position, a reduction up to 50% in initial loading can be achieved in approximately 0.1 second. These figures must be taken as exemplary only, for all figures are markedly influenced by the plane speed at the instant of bail-out, the foregoing values being for the higher supersonic speeds. However, it may be stated that an appreciable reduction in deceleration can be gained at all speeds in excess of Mach one.

Having thus described the invention with sufficient clarity to enable those familiar with this art to construct and use it, I claim:

1. The improvement in an ejection seat in an aircraft, comprising: a seat structure in said aircraft; ejecting means in said aircraft and acting on said seat structure operative to eject said seat structure upwardly from said aircraft; a rocket mounted on said seat structure and moving therewith upon ejection operative to produce a jet thrust acting in a different direction than the thrust of said ejecting means and causing said seat structure to tilt in a predetermined angular direction relative the direction of ejectment after separation from the aircraft and toward an optimum low drag position; control means acting on said rocket to operate the same as said ejecting means ejects said seat structure from said aircraft including a stop member mounted on said aircraft and a pivotal arm carried by said seat structure, said pivotal arm engaging said stop member as said seat structure is ejected upwardly by said ejecting means to fire said rocket.

2. The improvement in an ejection seat in an aircraft, comprising: a seat structure in said aircraft; fixed upright rails in said aircraft slidably supporting the seat structure while in the aircraft; ejecting means in said aircraft acting on said seat structure operative to eject said seat structure along said rails; stabilizing fins mounted on the seat structure operative to pivot about an axis transverse of said seat structure; means on said seat structure acting on said fins operative to damp the pivotal movement of the fins in both directions about said axis; a rocket mounted on said seat structure operative to produce a forward thrust along a line below the center of gravity of the mass to be ejected including the seat structure and occupant and thereby to pivot said seat structure toward an optimum low drag position; an initiator connected to said rocket; and cooperating means on the aircraft and seat structure operative to actuate the rocket initiator substantially as the seat structure leaves the aircraft.

3. The improvement in an ejection seat in an aircraft, comprising: a seat structure in said aircraft; fixed upright rails in said aircraft slidably supporting the seat structure while in the aircraft; ejecting means in said aircraft acting on said seat structure operative to eject said seat structure along said rails; stabilizing fins mounted on the seat structure operative to pivot about an axis transverse of said seat structure; means on said seat structure acting on said fins operative to damp the pivotal movement of the fins in both directions about said axis; means on said seat structure acting on said fins rendered effective in response to a predetermined degree of pivotal movement of the fins in one direction about said axis to thereafter limit the pivotal movement of said fins in both directions with respect to a predetermined median; a rocket mounted on said seat structure operative to produce a thrust forwardly directed below the center of gravity of the mass to be ejected including the seat structure and occupant and thereby to pivot said seat structure toward an optimum low drag position; an initiator connected to said rocket; and cooperating means on the aircraft and seat structure operative to actuate the rocket initiator approximately at the time the seat structure leaves the aircraft.

4. The improvement in an ejection seat in an aircraft, comprising: a seat structure in said aircraft; fixed upright rails in said aircraft slidably supporting the seat structure while in the aircraft; ejecting means in said aircraft acting on said seat structure operative to eject said seat structure along said rails; stabilizing fins mounted on the seat structure operative to pivot about an axis transverse of said seat structure from a first position angularly directed relative the seat structure back to resist tilting to a second position generally aligned with the seat back to direct the seat structure in alignment with the air stream; means on said seat structure acting on said fins operative to damp the pivotal movement of the fins in both directions about said axis; and additional means on said seat structure acting on said fins operative to resiliently resist movement of said fins in both directions about said axis.

5. The improvement in an ejection seat in an aircraft, comprising: a seat structure in said aircraft; fixed upright rails in said aircraft slidably supporting the seat structure while in the aircraft; ejecting means in said aircraft acting on said seat structure operative to eject said seat structure along said rails; stabilizing fins mounted on the seat structure operative to pivot about an axis transverse of the seat structure; means on said seat structure acting on said fins operative to damp the pivotal movement of the fins in both directions about said axis; additional means on said seat structure acting on said fins operative to resiliently resist movement of said fins in both directions about said axis; and means on said seat structure acting on said fins rendered effective in response to a predetermined degree of pivotal movement of the fins in one direction about said axis operative to limit thereafter the pivotal movement of said fins in both directions with respect to a predetermined median.

6. The improvement in an ejection seat in an aircraft, comprising: a seat structure in said aircraft; fixed upright rails in said aircraft slidably supporting the seat structure while in the aircraft; ejecting means in said aircraft acting on said seat structure operative to eject said seat structure along said rails; means on said seat structure operative to impart a tilt to said seat structure in a predetermined angular direction relative to the direction of ejectment as it leaves the aircraft and acting to pivot said seat structure toward an optimum low drag position; and stabilizing fins on said seat structure and exposed to the air stream after ejection operative to tend to limit said tilt to orient said seat structure in said optimum low drag position.

7. An ejection seat in accordance with claim 6 including means pivotally mounting said fins on said seat structure for rotational movement through a selected angle, and latch means on said seat structure acting on said fins operative to restrain said fins after pivotal movement through said angle.

8. An ejection seat in accordance with claim 7 including means on said seat structure acting on said fins operative to damp angular movement of said fins through a selected angle while restrained by said latch means.

9. The improvement in an ejection seat in an aircraft, said aircraft having a vertical stabilizer, comprising: a seat structure; ejecting means in said aircraft acting on said seat structure operative to eject the seat structure upwardly from the aircraft; first thrust producing means mounted on said seat structure operative to produce a thrust to cause the top of said seat structure to tilt backward to a predetermined angle after separation from the aircraft, said seat structure after being tilted being substantially in an optimum low drag position; means connected to said first thrust producing means to operate the same approximately as said ejecting means ejects said seat structure from the aircraft; and second thrust producing means mounted on said seat structure acting in opposition to said first means to stop tilting of said seat structure so that its momentum in rotation caused by said first means does not rotate the seat structure past said predetermined angle, said first and second thrust means after ejectment as said seat tilts having a component of force directed to assist in lifting the seat structure above said vertical stabilizer.

10. The subject matter of claim 9 in which said first and second means are respectively first and second rockets both generally forwardly directed before ejectment and the first rocket being directed on a line below and the second rocket being directed on a line above the center of gravity of the mass to be ejected including the seat structure and occupant, the composite of thrusts of the rockets during the first period after ejectment being directed for said backward tilting and during the last period until burn-out being directed to oppose said backward tilting.

11. The subject matter of claim 9 in which said first and second means are at least one rocket directed above and at least one rocket directed below the center of gravity of the mass to be ejected including the seat structure and occupant.

12. An ejection seat in accordance with claim 9 in which there are stabilizing fins on said seat structure mounted for pivotal movement from one angular position to another about an axis transverse of said seat structure from a first position angularly directed relative the seat structure back to resist said backward tilting to a second position generally aligned with the seat back to tend to direct the seat structure in alignment with the air stream substantially in said optimum low drag position, and means on said seat structure acting on said fins operative to limit the pivotal movement of said fins.

13. The improvement in occupant ejection means in an aircraft, comprising: a body in said aircraft adapted to receive an occupant; ejecting means in said aircraft acting on said body operative to eject the body substantially vertically from the aircraft; first thrust means mounted on said body operative to produce a thrust to cause the body to tilt in a predetermined direction after separation from the aircraft and toward an optimum low drag position; means connected to said first thrust means to operate the same approximately as said ejecting means ejects said body from the aircraft; and second thrust producing means on said body acting in opposition to said first thrust means to stop tilting of said body so that its momentum in rotation caused by said first thrust means does not pivot the body substantially past said optimum low drag position, the first and second thrust means acting on lines at opposite sides of the center of gravity of the mass to be ejected including the occupant.

References Cited in the file of this patent

UNITED STATES PATENTS

| | | |
|---|---|---|
| 2,527,020 | Martin | Oct. 24, 1950 |
| 2,541,087 | Musser | Feb. 13, 1951 |
| 2,552,181 | Kleinhans | May 8, 1951 |
| 2,702,680 | Heinemann et al. | Feb. 22, 1955 |
| 2,755,042 | Paddon | July 17, 1956 |